Figures 1, 2:
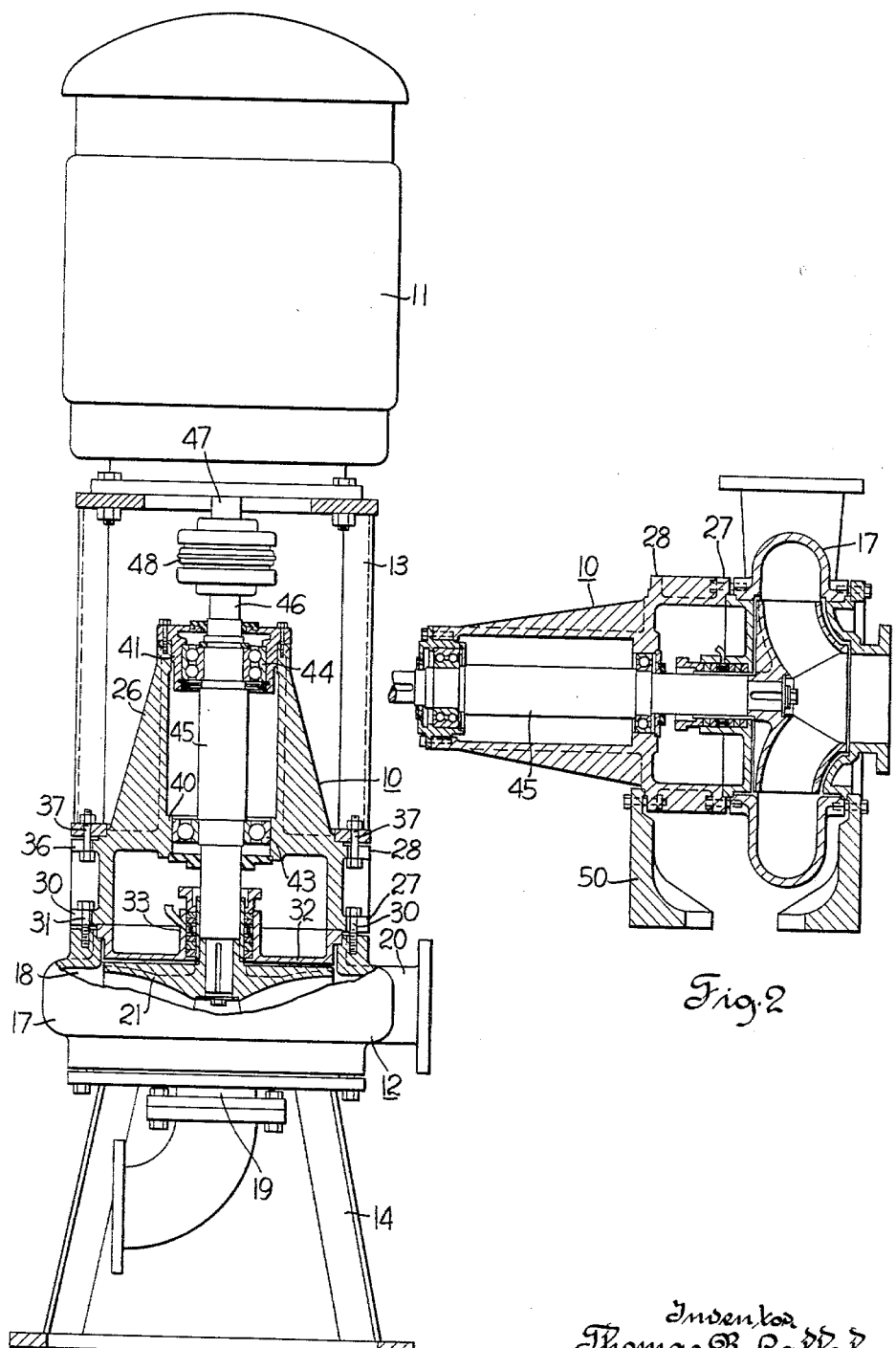

May 3, 1966     T. R. CALLAHAN     3,249,057
CENTRIFUGAL PUMP BEARING BRACKET
Filed Jan. 30, 1964

Inventor
Thomas R. Callahan
By Robert B. Benson
Attorney

United States Patent Office 3,249,057
Patented May 3, 1966

3,249,057
CENTRIFUGAL PUMP BEARING BRACKET
Thomas R. Callahan, Milford, Ohio, assignor to Allis-Chalmers Manufacturing Company, Milwaukee, Wis.
Filed Jan. 30, 1964, Ser. No. 341,280
4 Claims. (Cl. 103—87)

This invention relates generally to centrifugal pumps and more specifically to a novel bearing bracket for use with a pump and a pump driving unit.

In large vertical pumps the construction of the bearing bracket and arrangement of the power unit may cause substantial static and dynamic stresses to develop in the supporting parts and bearings, unless the structure is built to minimize these undesirable effects. Besides, the arrangement of parts should be one which makes service and disassembly as easy as possible.

The novel bearing bracket of this invention has a pair of spaced apart annular flanges to provide a convenient mounting means for both the pump and the drive motor. Although the bracket is more often used with a vertically mounted pump and pump drive, a suitable foot support may be connected to one flange in order to effectively mount the pump in a horizontal position. The bearings in the bearing bracket which serve to journal the pump shaft are so located relative to the mounting flanges as to reduce to a minimum the stresses induced by the weight of the drive motor and also the dynamic stresses imposed by application of power to the drive shaft. Specifically, the inboard bearing is located in radial alignment with one of the bracket mounting flanges, while the outboard bearing is axially spaced from the inboard bearing in a direction opposite to that of the other bracket mounting flange.

Therefore it is an object of the invention to provide a new and improved bearing bracket for association with a pump and pump driving unit.

Another object of this invention is to provide a new and improved bearing bracket.

Other objects and advantages of this invention will be apparent from the following description when read in connection with the accompanying drawing, in which:

FIG. 1 is a side elevation view partially in section showing the bearing bracket of this invention in combination with a vertically mounted motor pump unit; and FIG. 2 is a cross section view of the bearing bracket of this invention having a foot member attached thereto to provide for a horizontal mounting of the bracket.

Referring more specifically to the drawing by characters of reference, the bearing bracket 10 of this invention is illustrated in combination with an electric motor 11 and a centrifugal pump 12 which are vertically mounted by an appropriate motor support 13 and pump support 14.

The pump 12 is illustrated as a conventional centrifugal pump having a casing 17 defining a pumping chamber 18 having an axial inlet 19 and spaced discharge volute 20 with a pump impeller 21 rotatably mounted within the pumping chamber. Although a motor is illustrated as the driving means, it is obvious that a turbine or other drive means could be substituted for the motor to rotate the shaft. In this case, the motor 11 is connected to the bearing bracket 10 by an appropriate motor mounting device 13.

The bearing bracket 10 comprises a substantially annular elongated frame member 26 having a pair of radial outwardly extending flanges 27, 28 that are axially spaced from each other. The inboard or pump mounting flange 27 has a plurality of arcuately spaced slots or holes 30 formed therein for receiving appropriate bolts 31 for connecting the bearing bracket to the pump casing 17. As specifically shown in the drawing, the end of the bracket 10 is used to hold the end cover 32 of the pump casing in position. In the illustrated embodiment, the stuffing box 33 is an integral part of the end cover.

The other or outboard flange 28 of the bearing bracket 10 also has a plurality of arcuately spaced bolt slots or holes 36 formed therein for receiving bolts 37 that serve to attach or connect the motor mounting device 13 to the bearing bracket.

The bore of the bearing bracket 10 is formed to define two axially spaced bearing seats or housings 40, 41. The inboard bearing seat 40 is positioned immediately beneath the outboard flange 28 of the bracket. This bearing seat then is substantially radially aligned with the outboard flange 28. The other bearing seat 41 is axially spaced from the first bearing seat 40 in a direction opposite the direction that the pump mounting flange 27 is spaced from the motor support mounting flange 28. As illustrated, there are appropriate bearings 43, 44 mounted in the bearing seats. In the illustrated bracket, the bearings are designed to carry both the thrust and radial loads.

The bearings 43, 44 form the sole support of the pump shaft 45 but the motor 11 has its own bearings. Bearing 43 is a radial load bearing while bearing 44 is secured in its seat to carry both radial and thrust loads. The outboard end 46 of the pump shaft 45 extending through the bearing bracket is connected to the motor shaft 47 by an appropriate coupling means 48.

In the illustrated vertical units, the bearing bracket 10 is positioned between the pump and motor and the weight of the motor is transferred to the pump support 14 through the motor mounting device 13, the bearing bracket 10 and the pump casing. Therefore, to avoid excessive stress on the bearings in the bearing bracket, the bearings are very carefully located to avoid transferring any of the stress from the motor to the bearings. Hence, the inboard bearing 43 is aligned with the motor support flange 28 and the outboard bearing 44 is spaced as far as possible from the supporting flanges 27 and 28 of the bracket in the direction of the motor.

In the illustrated pump unit, the shafts 45, 47 can be uncoupled and the motor and motor mount 13 removed without disturbing the bearing bracket, pump and piping. More important, however, is the fact that the mounting flange 30 may be disconnected from the pump casing to permit the complete rotating assembly, the casing cover, bearing bracket and motor drive to be lifted free of the pump casing and piping. The parts thus removed may be repaired in the shop before returning to the normal assembled position in the pump.

The spaced bearings and bearing housings of the bearing bracket stand in an outboard direction away from the motor support flange. Thus, the bearing housing is not stressed by the motor mass or other attached parts.

The bearing bracket is completely independent of the pump and the drive. For example, the motor supporting frame may be connected to any type of a prime mover such as an engine turbine or motor.

In the alternate embodiment illustrated in FIG. 2, a suitable foot support 50 is connected to the annular flange 28 and a second foot support is connected to the pump casing 17 so that the unit may be mounted in a horizontal position. As in the other illustrated embodiments, the shaft 45 extending through the bearing bracket 10 can be connected to any suitable driving means such as an electric motor. Further, the pump casing 17 is connected to the bearing bracket 10 through the inboard flange member 27.

Although but two embodiments of this invention have been illustrated and described, it will be apparent to those skilled in the art that various modifications and changes can be made therein without departing from the spirit of the invention or the scope of the appended claims.

Having now particularly described and ascertained the nature of my said invention and the manner in which it is to be performed, I declare that what I claim is:

1. A pump unit comprising: a bearing bracket having an elongated annular one piece frame, said frame having first and second axially spaced flanges extending radially outward therefrom, the radially inner surface of said frame defining first and second spaced bearing seats, said first bearing seat being substantially radially aligned with said first flange, said second bearing seat being spaced from said first bearing seat in the opposite direction from which said second flange is spaced from said first flange, bearings mounted in said bearing seats, a pump connected to said second flange, said pump having a shaft extending through said bracket and journaled in said bearings, a drive member having a shaft extending therefrom connected to said first flange, said drive shaft being coupled to said pump shaft, and a support stand connected to said pump on the opposite side from said second flange to mount said unit in a vertical position.

2. The pump unit set forth in claim 1 wherein said drive member is a motor.

3. The motor pump unit set forth in claim 2 wherein said pump includes a rear cover plate supported between said sceond flange and said pump casing and wherein said pump shaft extends through said rear cover plate, said bracket and is journaled in said bearings.

4. The motor pump unit set forth in claim 2 and further comprising support feet connected to said pump casing and said first flange to mount said unit in a horizontal position.

References Cited by the Examiner

UNITED STATES PATENTS

| 1,934,189 | 11/1933 | Grier | 230—207 |
| 2,395,793 | 2/1946 | Stratford et al. | 103—87 |
| 3,048,118 | 8/1962 | Erd | 103—87 |

MARK NEWMAN, *Primary Examiner.*

ROBERT M. WALTER, DONLEY J. STOCKING,
*Examiners.*